(12) United States Patent
Barrand

(10) Patent No.: US 10,791,416 B2
(45) Date of Patent: Sep. 29, 2020

(54) SYSTEMS AND METHODS FOR OPTIMIZING MESSAGE NOTIFICATION TIMING BASED ON GEOGRAPHIC LOCATION

(71) Applicant: Oath Inc., Dulles, VA (US)

(72) Inventor: Bryce Barrand, Ashburn, VA (US)

(73) Assignee: Oath Inc., Dulles, VA (US)

( * ) Notice: Subject to any disclaimer, the term of this patent is extended or adjusted under 35 U.S.C. 154(b) by 0 days.

(21) Appl. No.: 16/211,979

(22) Filed: Dec. 6, 2018

(65) Prior Publication Data

US 2019/0110160 A1    Apr. 11, 2019

Related U.S. Application Data

(63) Continuation of application No. 15/624,256, filed on Jun. 15, 2017, now Pat. No. 10,182,310, which is a
(Continued)

(51) Int. Cl.
| | |
|---|---|
| *H04W 4/021* | (2018.01) |
| *H04L 29/08* | (2006.01) |
| *H04W 64/00* | (2009.01) |
| *G06Q 30/02* | (2012.01) |
| *H04W 68/02* | (2009.01) |
| *H04W 72/04* | (2009.01) |
| *H04W 4/029* | (2018.01) |

(52) U.S. Cl.
CPC ........ *H04W 4/021* (2013.01); *G06Q 30/0261* (2013.01); *H04L 67/26* (2013.01);
(Continued)

(58) Field of Classification Search
CPC .............................. G06Q 30/02; H04W 4/021
(Continued)

(56) References Cited

U.S. PATENT DOCUMENTS

2001/0014145 A1  8/2001  Kamel et al.
2004/0030753 A1  2/2004  Horvitz
(Continued)

FOREIGN PATENT DOCUMENTS

EP        1276336 A2       1/2003

OTHER PUBLICATIONS

International Preliminary Report on Patentability issued in related PCT/US204/065983, dated Jun. 2, 2016 (9 pages).
(Continued)

*Primary Examiner* — Thomas J Lett
(74) *Attorney, Agent, or Firm* — Bookoff McAndrews, PLLC

(57) ABSTRACT

Systems and methods are provided for timing message notifications to be provided to mobile device users based on their respective geographic locations with respect to a targeted content area. The timing of message notifications may be controlled in order to optimize the chances of delivering targeted content to a mobile device user based on the current geographic location of the user's device relative to a targeted content area. As the particular client application may not be actively executing at a time when the user's device happen to be located within a targeted content area, a general message notification sent to the user's device, which may be displayed at any time, may increase the likelihood that the user will launch the client application when it is not already executing at the device and thereby, allow targeted content to be delivered to the user's mobile device at the appropriate time and location.

15 Claims, 8 Drawing Sheets

Related U.S. Application Data continuation of application No. 15/051,705, filed on Feb. 24, 2016, now Pat. No. 9,712,965, which is a continuation of application No. 14/851,489, filed on Sep. 11, 2015, now Pat. No. 9,307,362, which is a continuation of application No. 14/736,561, filed on Jun. 11, 2015, now Pat. No. 9,167,383, which is a continuation of application No. 14/083,035, filed on Nov. 18, 2013, now Pat. No. 9,084,082.

(52) U.S. Cl.
CPC ........... *H04W 64/00* (2013.01); *H04W 68/02* (2013.01); *H04W 72/048* (2013.01); *H04W 4/029* (2018.02)

(58) Field of Classification Search
USPC ...................................... 455/456.3
See application file for complete search history.

(56) References Cited

U.S. PATENT DOCUMENTS

| | | |
|---|---|---|
| 2004/0193488 A1 | 9/2004 | Khoo et al. |
| 2006/0253453 A1 | 11/2006 | Chmaytelli et al. |
| 2007/0185768 A1* | 8/2007 | Vengroff ................ G06Q 30/04 705/14.64 |
| 2008/0248815 A1 | 10/2008 | Busch |
| 2010/0312639 A1 | 12/2010 | Mastronardi |
| 2011/0320259 A1 | 12/2011 | Roumeliotis et al. |
| 2012/0036015 A1 | 2/2012 | Sheikh |
| 2013/0053005 A1 | 2/2013 | Ramer et al. |
| 2013/0060634 A1 | 3/2013 | Corson et al. |
| 2013/0091016 A1* | 4/2013 | Shutter ................ G06Q 30/02 705/14.58 |
| 2013/0157567 A1 | 6/2013 | Hill |
| 2013/0218680 A1 | 8/2013 | Forsblom |
| 2013/0267196 A1 | 10/2013 | Leemet et al. |
| 2014/0310076 A1* | 10/2014 | Liberty .............. G06Q 30/0269 705/14.1 |
| 2015/0163629 A1 | 6/2015 | Cheung |
| 2015/0163630 A1* | 6/2015 | Hughes, Jr. ........... H04W 4/021 455/456.3 |
| 2015/0326624 A1 | 11/2015 | Rajendran et al. |
| 2019/0098443 A1* | 3/2019 | DeLuca ................ H04L 67/22 |

OTHER PUBLICATIONS

International Search Report and Written Opinion issued in corresponding International Application No. PCT/US2014/065983, dated Jun. 9, 2015 (11 pages).

\* cited by examiner

SYSTEMS AND METHODS FOR OPTIMIZING MESSAGE NOTIFICATION TIMING BASED ON GEOGRAPHIC LOCATION

CROSS-REFERENCE TO RELATED APPLICATION(S)

This application is a continuation of and claims the benefit of priority to pending U.S. application Ser. No. 15/624,256, filed on Jun. 15, 2017, which is a continuation of and claims the benefit of priority to U.S. application Ser. No. 15/051, 705, filed on Feb. 24, 2016 (now, U.S. Pat. No. 9,712,965, issued on Jul. 18, 2017), which is a continuation of and claims the benefit of priority to pending U.S. application Ser. No. 14/851,489, filed on Sep. 11, 2015 (now, U.S. Pat. No. 9,307,362, issued on Apr. 5, 2016), which is a continuation of and claims the benefit of priority to U.S. application Ser. No. 14/736,561, filed on Jun. 11, 2015 (now, U.S. Pat. No. 9,167,383, issued on Oct. 20, 2015), which is a continuation of and claims the benefit of priority to U.S. application Ser. No. 14/083,035, filed on Nov. 18, 2013 (now, U.S. Pat. No. 9,084,082, issued on Jul. 14, 2015), each of which is incorporated herein by reference in its entirety.

TECHNICAL FIELD

The present disclosure relates generally to location-based services for mobile device users and, more particularly, to providing messaging services to particular mobile device users based on their respective geographic locations.

BACKGROUND

Mobile devices, such as smartphones, now allow users to perform a variety of tasks that traditionally required different types of devices. For example, a user may be able to use different client applications executable at the same mobile device to browse online content, play audio files, capture digital images, view directions for navigating between different locations or points of interest, and exchange messages between other users or computing devices via a mobile communication network. A user may also download and install various third-party client applications at the user's mobile device for viewing information and content related to general topics of interest. An application developer or affiliated service provider may use such a client application to provide different services to the user. Such services may include messaging services to which the user may subscribe in order to receive, for example, real-time message notifications or breaking news alerts at the user's mobile device. The message notifications or alerts that are sent (or "pushed") by a service provider for a particular client application may be displayed within a general notifications window via a user interface of the operating system at the user's mobile device, even though the client application may be closed or not be actively executing at the mobile device when such notifications are received.

In addition to the message notifications or alerts provided by a service provider associated with the client application, third-party content providers may use the client application to deliver targeted content (e.g., advertisements) to the user at the mobile device. The targeted content that is sent to the user's mobile device at a particular time may be based on, for example, the current geographic location of the mobile device. The delivery of such geo-located content to the user's device may be triggered when, for example, the location of the user's mobile device is determined to be within a designated geographic area, e.g., covered by a geo-fence associated with the targeted content.

In contrast with the aforementioned message notifications that may be displayed within a general notifications window of the operating system's user interface, the targeted content from a third-party content provider is typically displayed within a dedicated portion of a user interface of the client application itself while it executes at the mobile device. An example of such targeted content may include, but is not limited to, an advertisement displayed within a pop-up window for a webpage loaded within a mobile web browser. Thus, conventional solutions for delivering targeted content to a user's mobile device typically require the client application to be open or actively executing at the mobile device in order for the content to be displayed to the user at the mobile device. However, there may be only a slight chance that the client application is actually open or executing at the user's device when the user and mobile device are located within a designated geographical area for delivering targeted content. Hence, the content displayed to the user when the client application is actually open and actively executing at the user's mobile device may not be the targeted content that is relevant to the user's current geographic location. Moreover, conventional solutions may not provide a way to deliver geo-located content that is relevant to the user's current geographic location to the user's device for display to the user at the device at the appropriate time.

SUMMARY OF THE DISCLOSURE

Embodiments disclose systems and methods for timing message notifications so as to optimize the delivery of targeted content to mobile device users.

According to certain embodiments, methods are disclosed for timing message notifications to optimize delivery of targeted content to mobile device users. Upon receiving an indication of a message to be sent for a client application executable at a mobile device of a user, a current geographic location of the mobile device is requested via a communication network. Upon receiving the requested current geographic location of the mobile device, it is determined whether or not the current geographic location of the mobile device is within a predetermined geographic area for providing targeted content to be displayed within a content view of the client application when the client application is executing at the mobile device. The targeted content is unrelated to the message to be sent for the client application. When the current geographic location of the mobile device is determined to be within the predetermined geographic area, the message is sent for display to the user at the mobile device via a message notification interface of an operating system of the mobile device. When the current geographic location of the mobile device is determined not to be within the predetermined geographic area, the message is added to a message queue. The added message is to be sent from the message queue for display to the user at the mobile device when either a detected change in the current geographic location of the mobile device is determined to be within the predetermined geographic area before a predetermined period of time has elapsed or once the predetermined period of time is determined to have elapsed.

According to certain embodiments, systems are disclosed for timing message notifications to optimize delivery of targeted content to mobile device users. One system includes a memory having processor-readable instructions stored therein and a processor configured to access the memory and execute the processor-readable instructions, which when executed by the processor configures the processor to perform a plurality of functions, including functions to: receive an indication of a message to be sent for a client application executable at a mobile device of a user; request a current geographic location of the mobile device via a communication network based on the received indication; receive the requested current geographic location of the mobile device; determine whether or not the current geographic location of the mobile device is within a predetermined geographic area for providing targeted content to be displayed within a content view of the client application when the client application is executing at the mobile device, wherein the targeted content is unrelated to the message to be sent for the client application; send the message for display to the user at the mobile device via a message notification interface of an operating system of the mobile device when the current geographic location of the mobile device is determined to be within the predetermined geographic area; and add the message to a message queue when the current geographic location of the mobile device is determined not to be within the predetermined geographic area, wherein the message is to be sent from the message queue for display to the user at the mobile device when either a detected change in the current geographic location of the mobile device is determined to be within the predetermined geographic area before a predetermined period of time has elapsed or once the predetermined period of time is determined to have elapsed.

According to certain embodiments, a computer readable medium is disclosed as storing instructions that, when executed by a computer, cause the computer to perform functions to: receive an indication of a message to be sent for a client application executable at a mobile device of a user; request a current geographic location of the mobile device via a communication network based on the received indication; receive the requested current geographic location of the mobile device; determine whether or not the current geographic location of the mobile device is within a predetermined geographic area for providing targeted content to be displayed within a content view of the client application when the client application is executing at the mobile device, wherein the targeted content is unrelated to the message to be sent for the client application; send the message for display to the user at the mobile device via a message notification interface of an operating system of the mobile device when the current geographic location of the mobile device is determined to be within the predetermined geographic area; and add the message to a message queue when the current geographic location of the mobile device is determined not to be within the predetermined geographic area, wherein the message is to be sent from the message queue for display to the user at the mobile device when either a detected change in the current geographic location of the mobile device is determined to be within the predetermined geographic area before a predetermined period of time has elapsed or once the predetermined period of time is determined to have elapsed.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
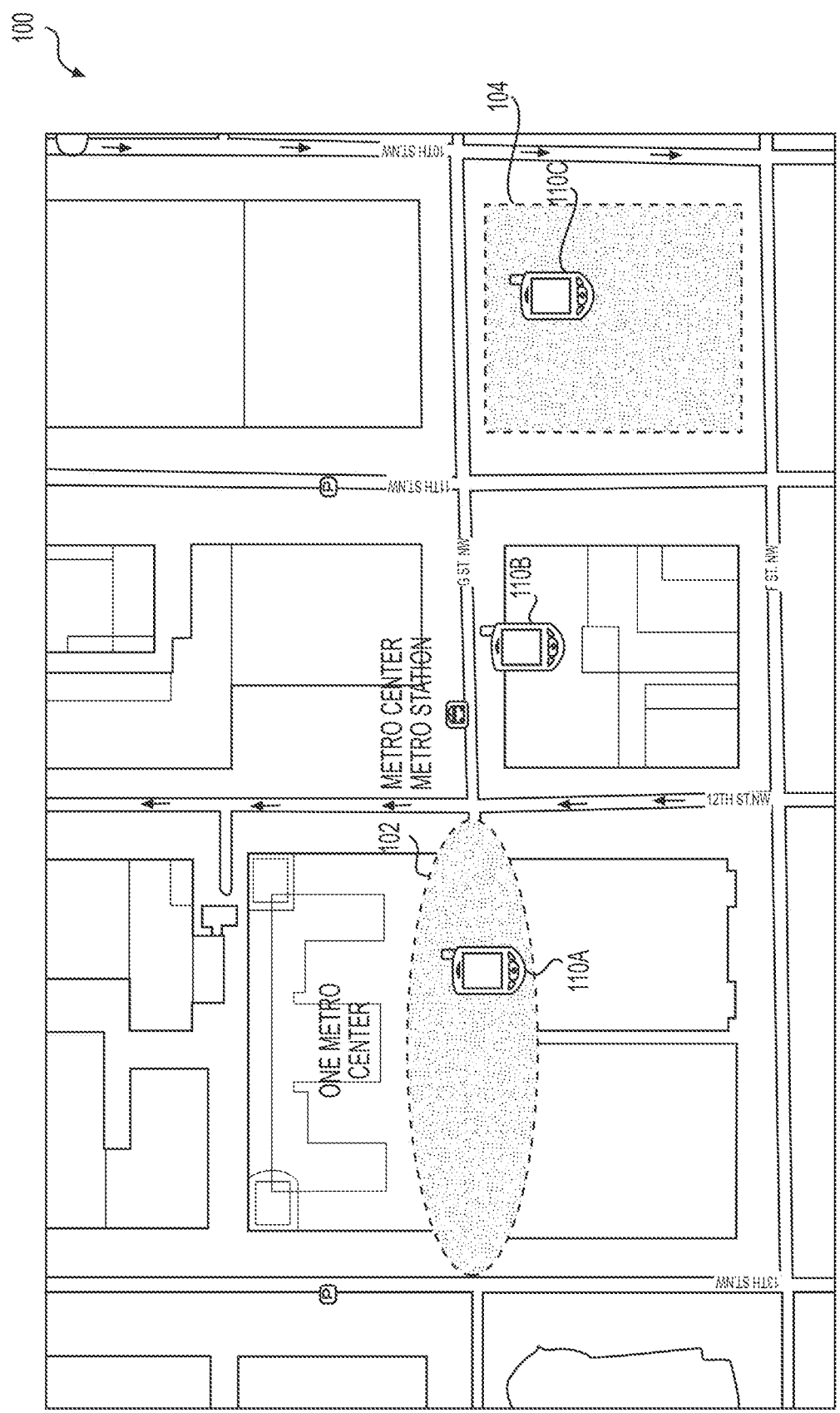
FIG. 1 is a view of a map showing multiple geo-fenced areas for providing targeted content to mobile device users determined to be located within the respective geo-fenced areas.

The present disclosure is directed to overcoming one or more of the above referenced issues. Specifically, the present disclosure is directed to timing message notification in order to optimize the chances of delivering targeted content to a mobile device user based on the current geographic location of the user's mobile device relative to a targeted content area. In an example, an application developer or affiliated information service provider, e.g., a news agency or other media outlet, associated with a client application may provide a mobile messaging service, to which the user may subscribe so as to authorize the service provider to send (e.g., "push") real-time message notifications (e.g., breaking news or other alerts) to the user's device via a mobile communication network. The notifications sent by a service provider associated with a client application executable at the user's device may be displayed within a general notifications window of a graphical user interface (GUI) of the device's operating system, even when the corresponding client application may not have been launched by the user or be actively executing at the mobile device.

In the above example, an authorized third-party content provider may also use the client application to deliver targeted content to the user's mobile device when the mobile device is determined to be within a targeted content area. The targeted content area may be, for example, a predetermined geographic area of any size and shape, e.g., as specified by the third-party content provider. The bounds of the geographic area may be defined by, for example, a customized geo-fence or virtual perimeter surrounding a particular location or point of interest (POI) related to the targeted content. Accordingly, the delivery of targeted content, which may be relevant to a POI located near the user's current geographic location, may be triggered when the location of the user's mobile device is determined to be within the corresponding geo-fenced area. Such targeted content is typically displayed within a designated portion of the client application's own GUI as it executes at the user's device, e.g., a banner advertisement presented in a bottom or top portion of the application's GUI (e.g., of a mobile browser) as it is displayed on a display screen of the user's device. Consequently, the targeted content is generally delivered to the user's device only when the client application is actively executing at the device, e.g., after the user has manually launched the application for execution via a user interface of the operating system at the mobile device.

It may be assumed that the mobile device user in the above example may be relatively unaware of the third-party content provider. Thus, while a user who has subscribed to messaging services offered by a service provider associated with a client application executable at the user's device may have authorized the application service provider to send general message notifications (e.g., push notifications) related to topics of interest to the user's device, the user may not have explicitly requested third-party content providers to send targeted content to the user's device in the same way. However, it may also be assumed for purposes of this example that the user has at least implicitly requested or authorized third-party content providers (e.g., with whom the application service provider may have entered into a partnership agreement) to deliver targeted content to the user's mobile device within a designated portion of the application's GUI while the client application is actively executing at the user's device (e.g., pursuant to terms and conditions of use accepted by the user).

As the particular client application may not be actively executing at a time when the user and device happen to be located within a targeted content area, the techniques disclosed herein may be used to increase the likelihood that the user will launch the client application when it is not already executing at the device and thereby, allow targeted content that may be relevant to the user's current geographic location to be delivered to the user's mobile device at the appropriate time. As will be described in further detail below, these techniques may be used to control the timing of general message notifications to be sent to the device for a client application so as to increase the likelihood that the user will launch the client application and that it will be actively executing at the user's device when the current geographic location of the mobile device is also within a targeted content area.

In an example, the delivery of a message notification associated with a client application executable at the user's device may be delayed for a predetermined period of time or until the current geographic location of the user's mobile device is determined to be within the targeted content area. When the message notification is eventually delivered to the user's mobile device and displayed within a general notifications window of the operating system's GUI at the device, the user may be more inclined to open the corresponding client application after viewing the message notification. In other words, the user may be more likely to launch the client application corresponding to a message notification (e.g., a breaking news alert) displayed at the user's device after viewing the message notification. In some implementations, the mobile operating system may allow the user to launch the client application associated with a particular notification directly from the notification window by selecting the notification as it is displayed via the operating system GUI at the mobile device. Thus, the techniques disclosed herein may be used to optimize the timing of the message notification displayed at the user's device so as to increase the probability that the corresponding client application is actively executing at the user's device when the device is also located within a targeted content area, e.g., by enticing the user to launch the client application when it is inactive, after viewing the message notification.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a view of a map 100 showing multiple geo-fenced areas for providing targeted content to mobile device users determined to be located within the respective geo-fenced areas. As shown in FIG. 1, map 100 includes a geo-fenced area 102 and a geo-fenced area 104. Each of geo-fenced areas 102 and 104 may be associated with one or more third-party content providers. In an example, a third-party content provider may be, for example, a public or private organization associated with the geographic location of each of geo-fenced areas 102 and 104. In addition, geo-fenced areas 102 and 104 may each correspond to, for example, the location of a venue, public landmark, commercial business (e.g., a restaurant, store, etc.), or other POI associated with the third-party content provider. Thus, the boundaries or dimensions of each of the geo-fenced areas 102 and 104 may correspond to, for example, the shape and size of a building or other physical structure associated with the organization (e.g., a restaurant, store, or other place of business). However, it should be noted that geo-fenced areas 102 or 104 may be of any size and shape, as desired for a particular implementation. For example, the size and shape of each geo-fenced area may be based on a predetermined radius around a specified location or POI.

Also, as shown in FIG. 1, map 100 indicates the geographic locations of a user device 110a, a user device 110b, and a user device 110c. Each of user devices 110a, 110b, and 110c may be implemented using, for example, any type of mobile computing device including, but not limited to, a laptop computer, tablet computer, mobile handset, smartphone, personal digital assistant (PDA), a dedicated portable Global Positioning System (GPS) navigation device, or similar type of mobile device. Further, each of user devices 110a, 110b, and 110c may be equipped with a GPS receiver for registering GPS location data, e.g., latitude and longitude coordinates, at a particular point or over a period of time. However, it should be noted that the physical or geographic location of each of user devices 110a, 110b, and 110c may be determined or estimated using any one or a combination of various well-known techniques for deriving such geographic location information. Examples of such techniques include, but are not limited to, GPS, cell identification (e.g., using Cell ID), cellular tower triangulation, multilateration, Wi-Fi, and any other network or handset based technique for deriving or estimating the physical or geographic location of a mobile device via a mobile communication network.

Each of user devices 110a, 110b, and 110c may be configured to execute one or more client applications. Such a client application executable at each of user devices 110a, 110b, and 110c may be associated with, for example, an information service provider. Further, each of user devices 110a, 110b, and 110c may be configured to receive message notifications related to topics of interest (e.g., breaking news alerts) for a user at each device. As will be described in further detail below, such notifications may be sent to each of user devices 110a, 110b, and 110c by a message server via a mobile communications network. The message notifications may be sent by the message server as, for example, push notifications that are periodically sent to each device. However, it should be noted that the techniques disclosed herein are not limited to push notifications and that these techniques may be applied with any type of messaging scheme or protocol used to deliver message notifications to user devices 110a, 110b, and 110c. For example, any of user devices 110a, 110b, or 110c may be configured to request (or "pull") pending notification messages from the message server via the mobile communication network.

As described above, the message notifications delivered to any of user devices 110a, 110b, or 110c for a particular client application executable at the device may be displayed within, for example, a general notifications window or similar type of user control element of a GUI provided by a mobile operating system at the device, particularly when the client application has not been opened or launched by the user and thus, the client application is not actively executing at the user's device. Also, as described above, the user of each device may have subscribed to a service offered by an application service provider associated with a client application executable at the user's device, which authorizes the application service provider to send relevant message notifications (e.g., as push notifications) to the user's device.

While a particular client application may be associated with a service provider that is unrelated to any of the third-party content providers associated with each of geo-fenced areas 102 and 104, the application service provider may have authorized each third-party content provider to provide targeted content for display within a designated portion of the client application's GUI as it executes at the device. Such authorization may be pursuant to, for example, a partnership or advertising agreement between the application service provider and the third-party content provider. Accordingly, the third-party content provider associated with geo-fenced area 102 may provide targeted content to user device 110a via a mobile communication network, when the geographic location of mobile device 110a is determined to be within geo-fenced area 102 and an eligible client application, e.g., which may be associated with a service provider with whom the third-party content provider has a partnership agreement in place, is actively executing at user device 110a. Similarly, targeted content associated with geo-fenced area 104 may be provided to an appropriate client application executing at user device 110c, when user device 110c is determined to be within geo-fenced area 104. However, as described above, in some cases, the targeted content may be provided to each of user devices 110a and 110c only when the appropriate client application in this example is actively executing at each of user devices 110a and 110c.

In an example, a user of a client application executable at user device 110b may have subscribed to a messaging service provided by an application service provider associated with the client application in order to receive push notifications related to topics or events of interest to the user. Such a messaging service may be hosted at a message server associated with the client application or application service provider. Additional details of such a message server will be described in further detail below in reference to FIGS. 2-4. Examples of different push notifications that may be sent for the user at user device 110b include, but are not limited to, news alerts related to topics or keywords previously specified by the user, system or service-related message notifications, public safety advisories, and notifications of comments or messages posted to an electronic message board by other users (e.g., members of a social networking group associated with the user of user device 110b). The push notifications may be periodically sent by, for example, a messaging service of the application service provider to user device 110b via a mobile communication network. The notifications received at user device 110b may be displayed in a general notifications window of a GUI provided by the operating system of user device 110b.

As indicated by map 100, the current geographic location of user device 110b in this example may not be within a designated targeted content area, e.g., corresponding to either of geo-fenced areas 102 or 104. Thus, upon determining that user device 110b is not currently located within a targeted content area, the above-described messaging service provided by the application service provider may add a new message to be sent (or pushed) as a notification to user device 110b to a message queue maintained by the message server. As will be described in further detail below, the determination of whether or not a particular geographic location corresponds to a targeted content area may be made by a content server associated with a third-party content service provider based on the current geographic location of user device 110b. The current location of user device 110b may be forwarded to the content server by an application server or message server associated with the application service provider.

In some implementations, a message or message notification that may be added to the message queue may be associated with an expiration time that may be used to determine the period of time that the message will be kept in the queue before being delivered to user device 110b, regardless of the device's current geographic location. The expiration time associated with a queued message may be based on, for example, a predetermined time period that reflects a priority level assigned to the particular message notification. For example, an important public advisory message or breaking news alert may be assigned a relatively high priority level, and therefore, be associated with a relatively short expiration time. Thus, such high priority message notifications may be kept in the queue for a relatively short time period or alternatively, be sent immediately to user device 110b, without being added to the message queue.

In the above example, user device 110b may be configured to periodically report its current geographic location to the application or message server as this location changes over a period of time. As will be described in further detail below, upon receiving an indication of a new or updated current geographic location of user device 110b, the message server may query the appropriate third-party content server to determine whether the updated geographic location is within a targeted content area. However, it should be noted that this determination may be made by the application server or message server itself, e.g., based on stored information identifying the locations and boundaries of various predetermined targeted content areas. It should also be noted that the application server or message server may communicate with multiple third-party content servers, which may be associated with different third-party content providers, via an electronic communication network, as will be described in further detail below.

If it is determined that the updated geographic location of user device 110b is within a targeted content area, e.g., within geo-fenced area 102 or geo-fenced area 104, the message server may check the message queue for any previously queued messages. The message server may then send a message notification from the message queue to user device 110b, upon finding at least one message in the message queue.

Figure 2:
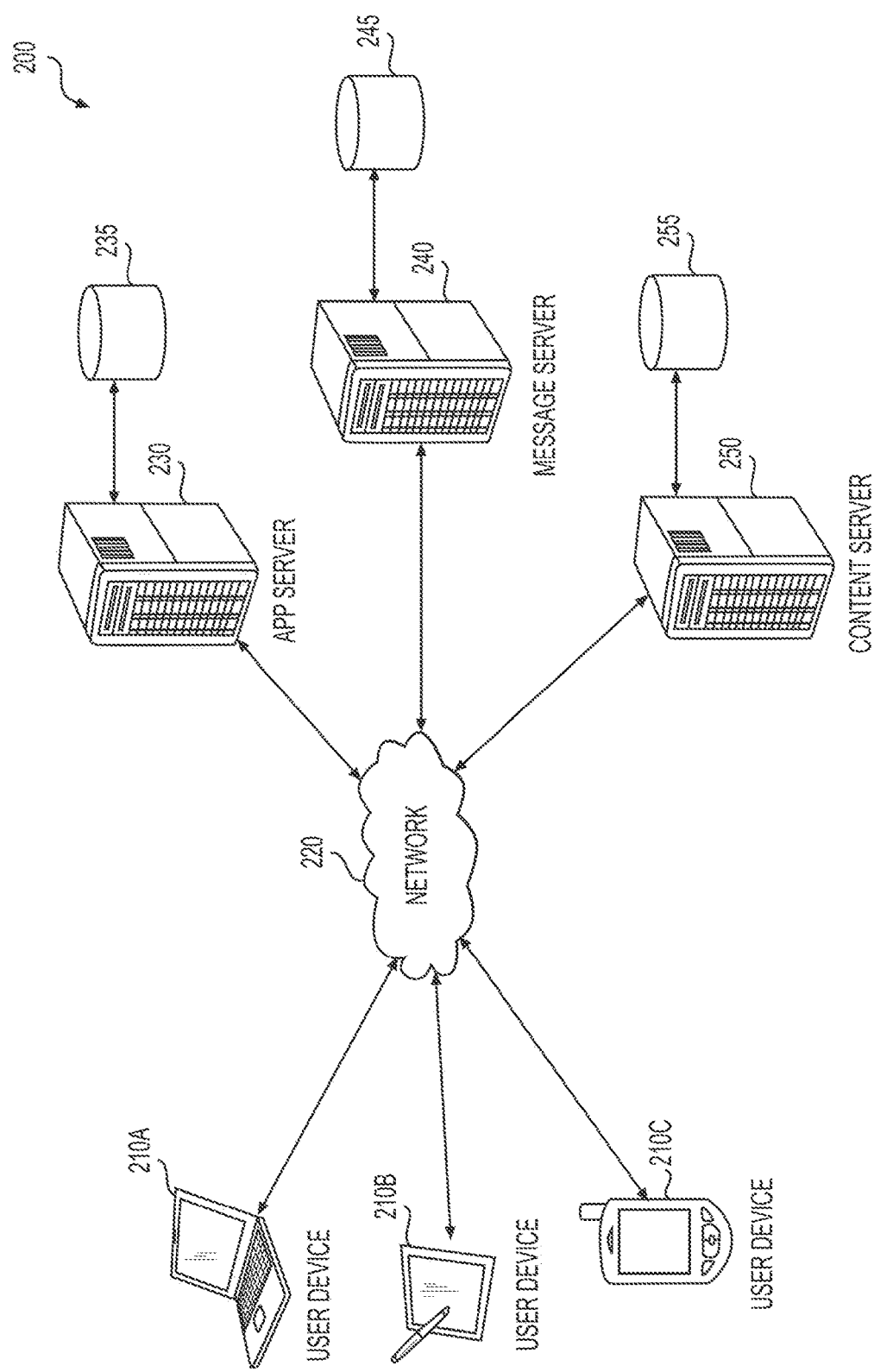
FIG. 2 is a block diagram of an exemplary communication system suitable for practicing an embodiment of the present disclosure.

FIG. 2 is a block diagram of an exemplary communication system 200 for practicing embodiments of the present disclosure. As shown in FIG. 2, system 200 includes user devices 210a, 210b, and 210c, an application server 230 coupled to a database 235, a message server 250 coupled to a database 255, and a content server 260 coupled to a database 265, all of which may be communicatively coupled via an electronic communication network 220.

Network 220 may be any type of electronic network or combination of networks used for communicating digital content and data between various computing devices. Network 220 may include, for example, a local area network, a medium area network, or a wide area network, such as the Internet. While only user devices 210a, 210b, and 210c are shown in FIG. 2, system 200 may include any number of user devices. Similarly, while only application server 230, message server 240, and content server 250 are shown in FIG. 2, it should be understood that system 200 may include additional or fewer servers, as desired for a particular implementation. Further, while not shown in FIG. 2, network 220 may include various switches, routers, gateways, or other types of network devices used to facilitate communication between various computing devices via network 220.

In the example shown in FIG. 2, user device 210a may be a laptop, notebook, netbook, or similar type of mobile computing device. User device 210b may be, for example, a tablet device or similar type of mobile device having a touchscreen display. User device 210c may be, for example, a mobile handset, smartphone, or personal digital assistant ("PDA"). However, it should be noted that each of user devices 210a, 210b, and 210c may be any type of mobile computing device configured to send and receive different types of data including, but not limited to, website data, multimedia content, electronic advertisements, and any other type of digital information, over network 220. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Each of application server 230, message server 240, and content server 250 may be any of various types of servers including, but not limited to, a web server, a proxy server, a network server, or other type of server configured to exchange electronic information with other servers or computing devices via a communication network, e.g., network 220. Such a server may be implemented using any general-purpose computer capable of serving data to other computing devices including, but not limited to, user devices 210a, 210b, and 210c or any other computing device (not shown) via network 220. Such a server may include, for example and without limitation, a processor and memory for executing and storing processor-readable instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. The server may also be implemented using multiple processors and multiple shared or separate memory devices within, for example, a clustered computing environment or server farm.

Also, as shown in FIG. 2, application server 230, message server 240, and content server 250 are communicatively coupled to databases 235, 245, and 255, respectively. Each of databases 235, 245, and 255 may be a data store or memory accessible to the corresponding server and may be implemented using any type of data storage device or recording medium used to store various kinds of data or content. Such data or content may include, for example and without limitation, text or media content that may be later provided to each of user devices 210a, 210b, and 210c via network 220.

In an example, each of user devices 210a, 210b, and 210c may execute a client application that communicates with application server 230, message server 240, or content server 250 via network 220. Further, each of user devices 210a, 210b and 210c may be configured to receive application content through an interface provided by application server 230 via network 220. The content provided by application server 230 may be based on, for example, user requests initiated via a GUI of the client application executable at each device. The GUI of the client application executable at each of user devices 210a, 210b, and 210c may be configured to present the content to a user at each device via a display of the respective user devices 210a, 210b, and 210c. The GUI of the client application may include, for example, various control elements enabling the user to request various types of content, e.g., which may be associated with a web site maintained by the application service provide. Further, a portion of the GUI of the client application may serve as a content view area used to display content (e.g., electronic advertisements) from a third-party content provider associated with content server 250. Such a content view of the client application may be a dedicated content area, e.g., displayed at the very top or bottom portion, of the application's GUI. As described above, such third-party content, e.g., as provided by content server 250 via network 220, may be displayed within the content view of the client application when the client application is actively executing at user device 210a, 210b, or 210c. Also, as described above, such third-party content may be different from the messages sent by an application provider for display to the user via a general message notifications interface of the operating system at user device 210a, 210b, or 210c, even when the client application is dormant or not actively executing at the particular device.

Application server 230 may be configured to host a web service that provides users various types of functionality via a GUI of the client application executable at each of user devices 210a, 210b and 210c. Such functionality may include, for example and without limitation, providing digital content distributed by an application service provider associated with the client application. The application service provider may be, for example, an online content provider, including those associated with various search engines, e-mail programs, RSS feed providers, magazines, e-zines, blogs, or any other online site or program that publishes or distributes online content related to, for example, news or various topics of general public interest. As described above, a functionality provided by such an application service provider may include sending messages, e.g., push notifications, related to topics of interest, as specified by a user/subscriber of each user device. Also, as described above, the messages sent to each device may be displayed for the user via a message notifications interface of a mobile operating system at each of user devices 210a, 210b, and 210c if, for example, the client application has not been launched by the user or is not actively executing at the user's device.

Further, application server 230 and message server 240 may be configured to communicate with content server 250 or one or more other third-party content servers (not shown) to retrieve content (e.g., electronic advertisements) via network 220 to be displayed within a content view of a client application executable at each of user devices 210a, 210b, and 210c. Further, application server 230, message server 240, and content server 250 may each interact with one another, user devices 210a, 210b, or 210c, or any other servers or network devices (not shown) via network 220. Examples of such other servers include, but are not limited to, DNS servers, ad servers, and content distribution servers.

Message server 240 in this example may be configured to control the timing of messages or push notifications to be sent via network 220 to each of user devices 210a, 210b, and 210c based on the current geographic location of each device relative to one or more predetermined geographic areas for delivering targeted content for display to a user at each device, e.g., geo-fenced areas 102 and 104, as described above. In an example, message server 240 may delay the sending of a message when the current geographic location of the device is determined not to be located within at least one of these targeted content areas. As will be described in further detail below, message server 240 may add the message to a message queue for the client application. Message server 240 may be configured to send the message from the message queue to user device 210a, 210b, or 210c via network 220, upon receiving an indication of an updated current geographic location of the device and determining that the new or updated location corresponds to a targeted content area.

In an example, message server 240 may communicate with content server 250 to determine whether or not the current geographic location of user device 210a, 210b, or 210c is within a targeted content area, as described above and as will be described in further detail below. Content server 250 may be configured to receive a request including the current geographic location of user device 210a, 210b, or 210c from message server 240 and send an appropriate response to message server 240 after determining whether the received geographic location corresponds to at least one targeted content area. Such a targeted content area may be one of a plurality of different targeted content areas corresponding to various predetermined geographic areas for providing targeted or geo-located content to mobile device users when each user's mobile device is determined to be located within any of the predetermined areas. As described above, the targeted content delivered to a user's device may be relevant to a particular location or POI associated with the predetermined geographic area. Further, the delivery of such targeted content may be triggered when the user's mobile device is detected within the boundary of a geo-fence corresponding to the predetermined geographic area.

In some implementations, message server 240 may be implemented as a back-end component that interfaces with only application server 230 and content server 250. Thus, it should be noted that for some implementations, message server 240 may be configured to act as an intermediary between application server 230 and content server 250, without any direct communication with any of user devices 210a, 210b, or 210c, in order to facilitate the message notification timing functionality described herein. Accordingly, application server 230, message server 240, and content server 250 may be configured to exchange information in the form of messages, requests, or responses that are passed between the servers. The communication between application server 230, message server 240, and content server 250 may be over network 220 or a virtual private network accessible to each server. In an example, messages added to the message queue may be routed from message server 240 to application server 230, when it is determined that user device 210a, 210b, or 210c is located within a targeted content area. Application server 230 may then send the routed message to user device 210a, 210b, or 210c via network 220. However, it should be noted that the functions performed by application server 230, message server 240, content server 250 or any combination thereof, as described herein, may be implemented using a single server. Additional features and characteristics of the communication between user devices 210a, 210b, and 210c, application server 230, message server 240, and content server 250 will be described in further detail below with respect to FIGS. 3 and 4.

Figure 3:
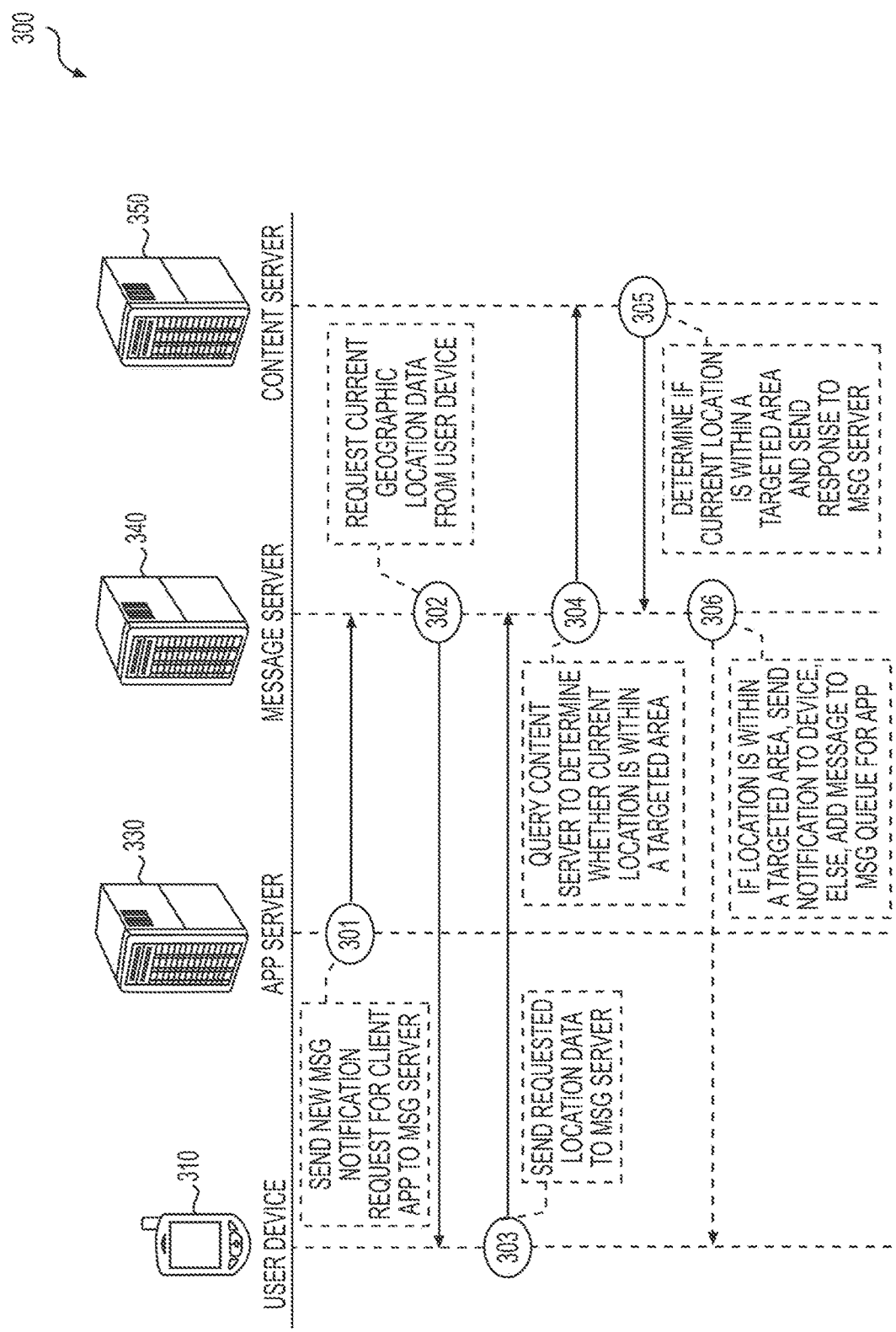
FIG. 3 is a communication flow diagram of an exemplary process for optimizing the timing of message notifications for a mobile device user based on a current geographic location of the user's device relative to a predetermined targeted content area.

FIG. 3 is a communication flow diagram of an exemplary process 300 for optimizing the timing of message notifications for a mobile device user based on a current geographic location of the user's device relative to a targeted content area, as described above. The example shown in FIG. 3 illustrates the communication flow between a user device 310, an application server 330, a message server 340, and a content server 350. For purposes of discussion, process 300 will be described using map 100 of FIG. 1 and system 200 of FIG. 2, as described above, but process 300 is not intended to be limited thereto. Thus, user device 310 may be implemented using, for example, any of user devices 210a, 210b, or 210c of FIG. 2, as described above. Similarly, application server 330, message server 340, and content server 350 may be implemented using, for example, application server 230, message server 240, and content server 250, respectively, as described above.

As shown in FIG. 3, application server 330 may send a new message notification request for a client application executable at user device 310 to message server 340 via a communication network, e.g., network 220 of FIG. 2, as described above (step 301). Message server 340 may in turn request a current geographic location of user device 310 (step 302). The request may be sent by message server 340 directly to user device 310, as shown in FIG. 3, or alternatively, message server 340 may send the request to application server 330, which may then request the geographic location information from user device 310, if necessary. In some implementations, application server 330 may respond to the request from message server 340 by sending a last known or previously determined or estimated geographic location of user device 310, e.g., which may be stored in a memory or data store (e.g., database 235 of FIG. 2, as described above) coupled to application server 330. Accordingly, user device 310 may send the requested location data (or current geographic location information) to message server 340 (step 303), or to whichever server (e.g., application server 330) may have requested the information from user device 310.

Message server 340 may be configured to query content server 350 to determine whether or not the current geographic location of user device 310 is within a targeted content area, as described above (step 304). Content server 350 may then determine if the current location of user device 310, as forwarded by message server 340, corresponds to at least one targeted content area and send the result of the determination to message server 340 (step 305). Such a targeted content area may correspond to, for example, a predetermined geographic area bounded by a virtual perimeter of a geo-fence, as described above. Further, the targeted content area may be one of many targeted content areas corresponding to different geo-fenced areas, e.g., geo-fenced areas 102 and 104 of FIG. 1, as described above. If the current geographic location of user device 310 is determined (e.g., by content server 350) to be within a targeted content area, message server 340 may send the message notification to user device 310 for display to the user at user device 310 via a general notifications interface of the operating system of user device 310, as described previously (step 306). Alternatively, if the device's location is determined not to be within a targeted content area, the message may be added to a message queue to be sent at a later time, as described above.

It should be noted that in some implementations, the determination of whether the device's location corresponds to a targeted content area may be performed by message server 340 itself, e.g., based on information specifying one or more targeted content areas associated with the particular client application executable at user device 310. Such information may be stored within a memory or data store (e.g., database 245 of FIG. 2) coupled to message server 340, as described above.

Figure 4:
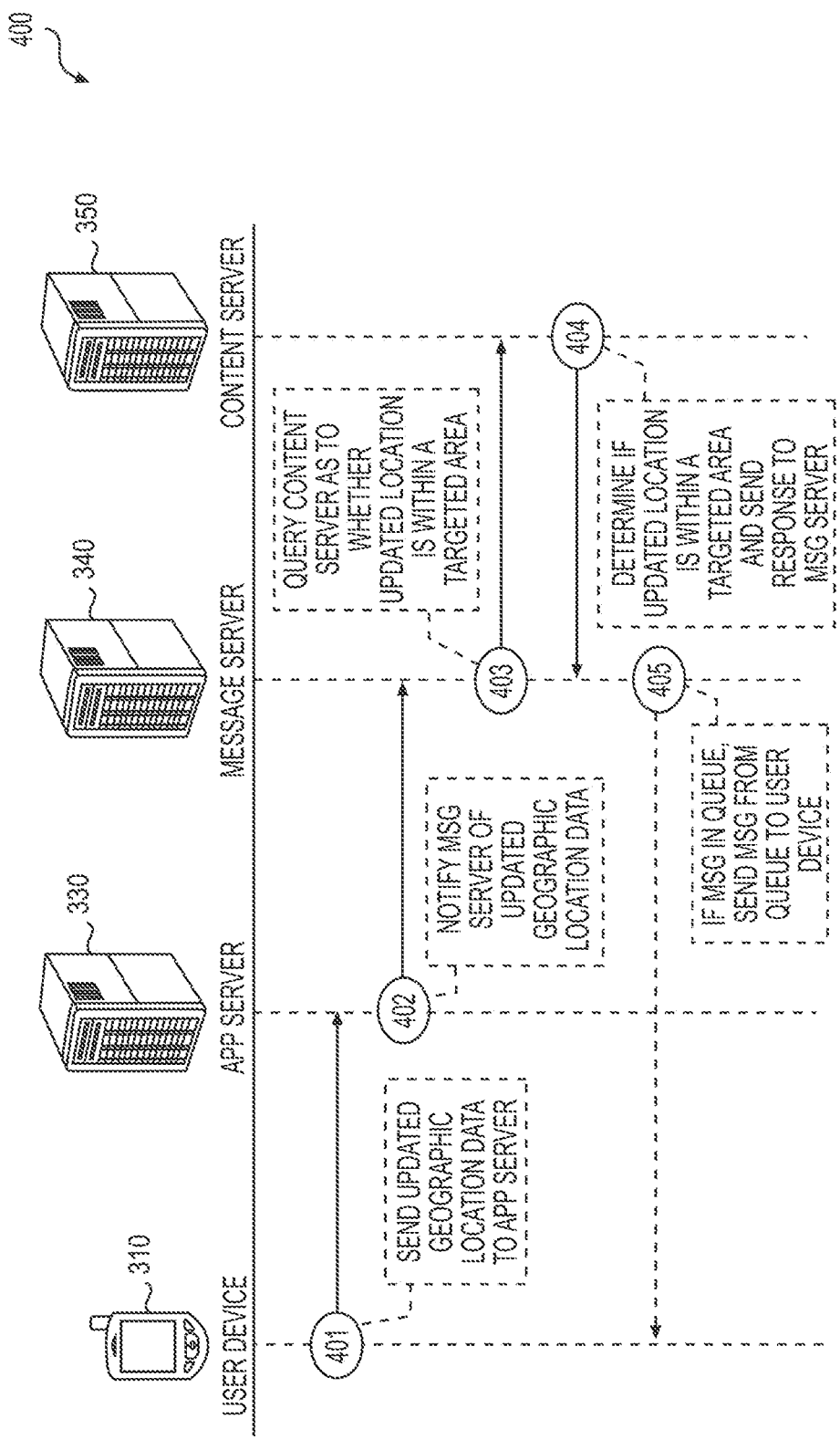
FIG. 4 is a communication flow diagram of an exemplary process for optimizing the timing of message notifications for the mobile device user of FIG. 3 based on a detected change in the current geographic location of the user's device relative to a predetermined targeted content area.

FIG. 4 is a communication flow diagram of an exemplary process 400 for optimizing the timing of message notifications for the user of mobile device 310 of FIG. 3, as described above, based on a detected change in the current geographic location of the user's device relative to a predetermined targeted content area. As shown in FIG. 4, the detected change in location may be based on, for example, an updated current geographic location sent by user device 310 or an operating system thereof to application server 330 via a network, e.g., network 220 of FIG. 2, as described above (step 401).

Application server 330 may then notify message server 340 of the updated geographic location information received from user device 310 (step 402). In response to the notification from application server 330, message server 340 may query content server 350 as to whether the updated current location of user device 310 is within a targeted content area (step 403). The results of the determination may be sent in a response from content server 350 to message server 340 (step 404). If the response from content server 350 indicates that the updated location is within a targeted content area, message server 340 may check a message queue associated with the particular client application executable at user device 310 to determine if there are any pending message notifications within the queue that need to be sent to user device 310, e.g., as added previously by message server 340 (at step 306 of process 300 of FIG. 3, as described above). Message server 340 may send the message to user device 310 via a communication network, e.g., network 220 of FIG. 2 (step 405), only if a message is found within the message queue or do nothing otherwise.

If message server 340 in this example finds multiple messages within the message queue for the client application, message server 340 may be configured to select the appropriate message to send to user device 310 using any one of various priority schemes as desired for a particular implementation. Examples of such priority schemes include, but are not limited to, first-in-first-out (FIFO), last-in-first-out (LIFO), or an alternative scheme based on message priority. In an example, the priority scheme may be based on an expiration time associated with each message added to the message queue. The expiration time may be used to determine the maximum period of time that a message should be held in the message queue prior to being delivered to user device 310. In some implementations, the expiration time may reflect a priority level assigned to the message, e.g., by the application service provider associated with the client application, as described above.

Figure 5:
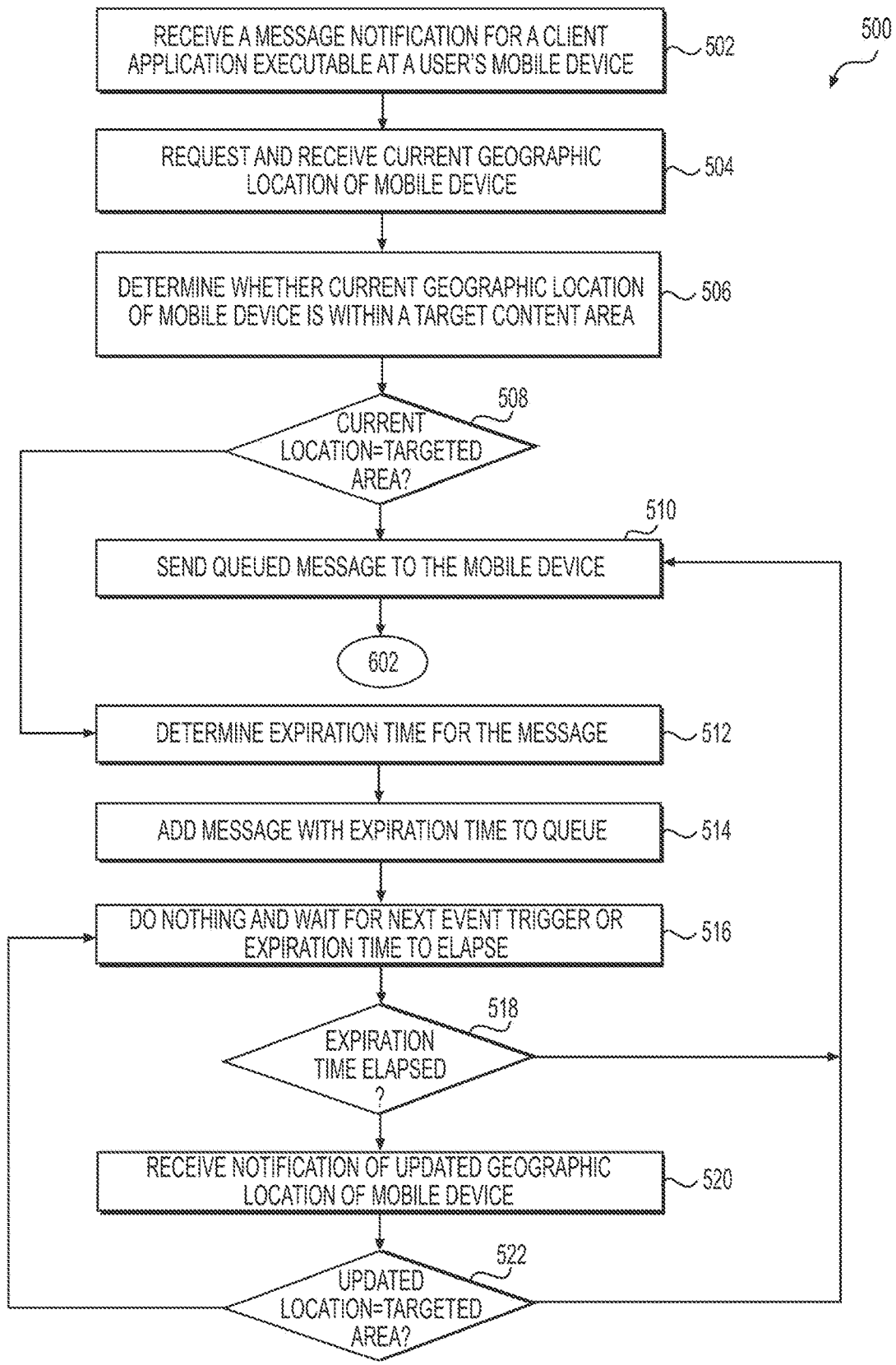
FIG. 5 is a process flow diagram of an exemplary method for optimizing the timing of message notifications for a mobile device user based on a current geographic location of the user's device relative to a predetermined targeted content area.

FIG. 5 is a process flow diagram of an exemplary method 500 for optimizing the timing of message notifications for a mobile device user based on a current geographic location of the user's device relative to a predetermined targeted content area. For purposes of discussion, method 500 will be described using system 200 of FIG. 2 and the components of processes 300 and 400 of FIGS. 3 and 4 (including application server 330, message server 340, and content server 350), as described above, but method 500 is not intended to be limited thereto. As shown in FIG. 5, method 500 includes steps 502, 504, 506, 508, 510, 512, 514, 516, 518, 520, and 522. However, it should be noted that method 500 may include more or fewer steps as desired for a particular implementation. In an example, one or more of the above-listed steps of method 500 may be executed by message server 240 of FIG. 2 or message server 340 of FIGS. 3 and 4, as described above. However, method 500 is not intended to be limited thereto, and the steps of method 500 may be performed by any server (e.g., application server 230 of FIG. 2 or application server 330 of FIGS. 3 and 4) or other type of computing device having at least one processor, a memory, and a network communication interface for sending and receiving information from one or more user devices.

Method 500 begins in step 502, which includes receiving a message notification for a client application executable at a user's mobile device (e.g., user device 210 of FIG. 2 or user device 310 of FIGS. 3 and 4, as described above). In step 504, a current geographic location of the mobile device is requested and received from the mobile device. Steps 506 and 508 may include, for example, determining whether a current geographic location of the mobile device is within a targeted content area. In some implementations, this determination may be based on a response received from querying a content server (e.g., content server 250 of FIG. 2 or content server 350 of FIGS. 3 and 4) using the geographic location information received from the user's mobile device. If it is determined in step 508 that the current geographic location of the mobile device is within a targeted content area, method 500 may proceed to step 510, which includes sending a message from a message queue to the mobile device. Once the message has been sent, method 500 may proceed to step 602 of method 600 of FIG. 6, as will be described in further detail below.

Figure 7:
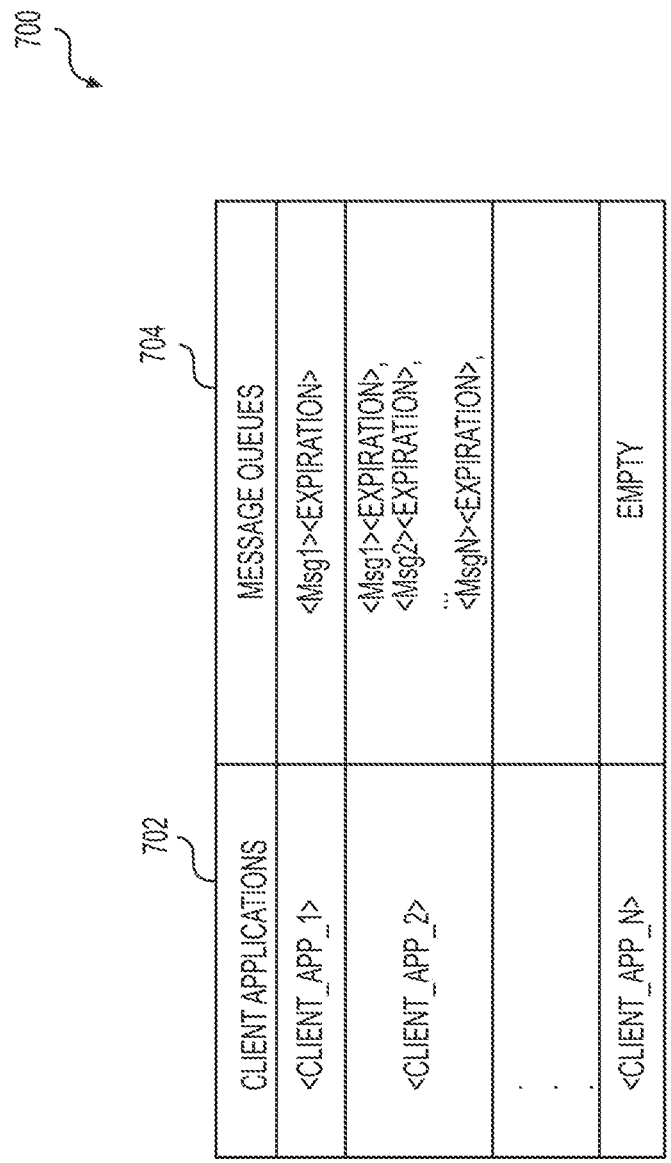
FIG. 7 is an exemplary table for associating different client applications with corresponding message queues.

It should be noted that step 510 may also include first checking the message queue to determine whether or not it includes any pending messages to be sent to the mobile device for the particular client application. The message queue in this example may be associated with the particular client application. In an example, an association between a queue of messages and a unique identifier associated with the client application may be maintained, e.g., by message server 240 of FIG. 2 or message server 340 of FIGS. 3 and 4, as described above. FIG. 7 shows an exemplary table 700 that may be used for associating different client applications, represented by corresponding client application identifiers 702 and their respective message queues 704. As shown in table 700, each message that is added to a message queue associated with a client application may include an expiration time used to determine the maximum amount of time that the message may be kept in the queue before being sent to the user's device, regardless of its current geographic location, as described above. Table 700 may be stored within a database (e.g., database 245 of FIG. 2) coupled to the server in this example.

However, if it is determined in step 508 that the current geographic location of the mobile device is not within a targeted content area, method 500 may proceed to step 512, which includes determining or calculating an expiration time associated with the message. In an example, the expiration time for a message may be based on a priority level assigned to the message, e.g., by an application service provider associated with the client application, as described above. Thus, a message having a relatively higher priority level may be assigned a relatively shorter expiration time, e.g., starting from the time that the message was added to the queue. In step 514, the message is added with the expiration time to the appropriate message queue. Method 500 then proceeds to step 516, which includes waiting for a predetermined event to be triggered or the expiration time of the message to elapse. An example of such a predetermined event includes, but is not limited to, receiving a notification of an updated or detected change in current geographic location for the mobile device.

If it is determined in step 518 that the expiration time for the message has elapsed, method 500 proceeds to step 510, in which the message is sent from the message queue to the user's mobile device. Otherwise, method 500 proceeds to step 520, which may include receiving a notification of an updated geographic location of the mobile device, e.g., a type of predetermined event trigger described above with respect to step 516. In step 522, it is determined whether or not the updated geographic location of the mobile device is within a targeted content area, e.g., either the same or different targeted content area used to provide targeted content for the particular client application. In an example, the aforementioned server may store an association between each of various client applications executable at the user's device and one or more targeted content areas corresponding to each client application. Such information may be stored within a table, for example, table 700 of FIG. 7, as described above, along with the message queue and expiration time information.

Figure 6:
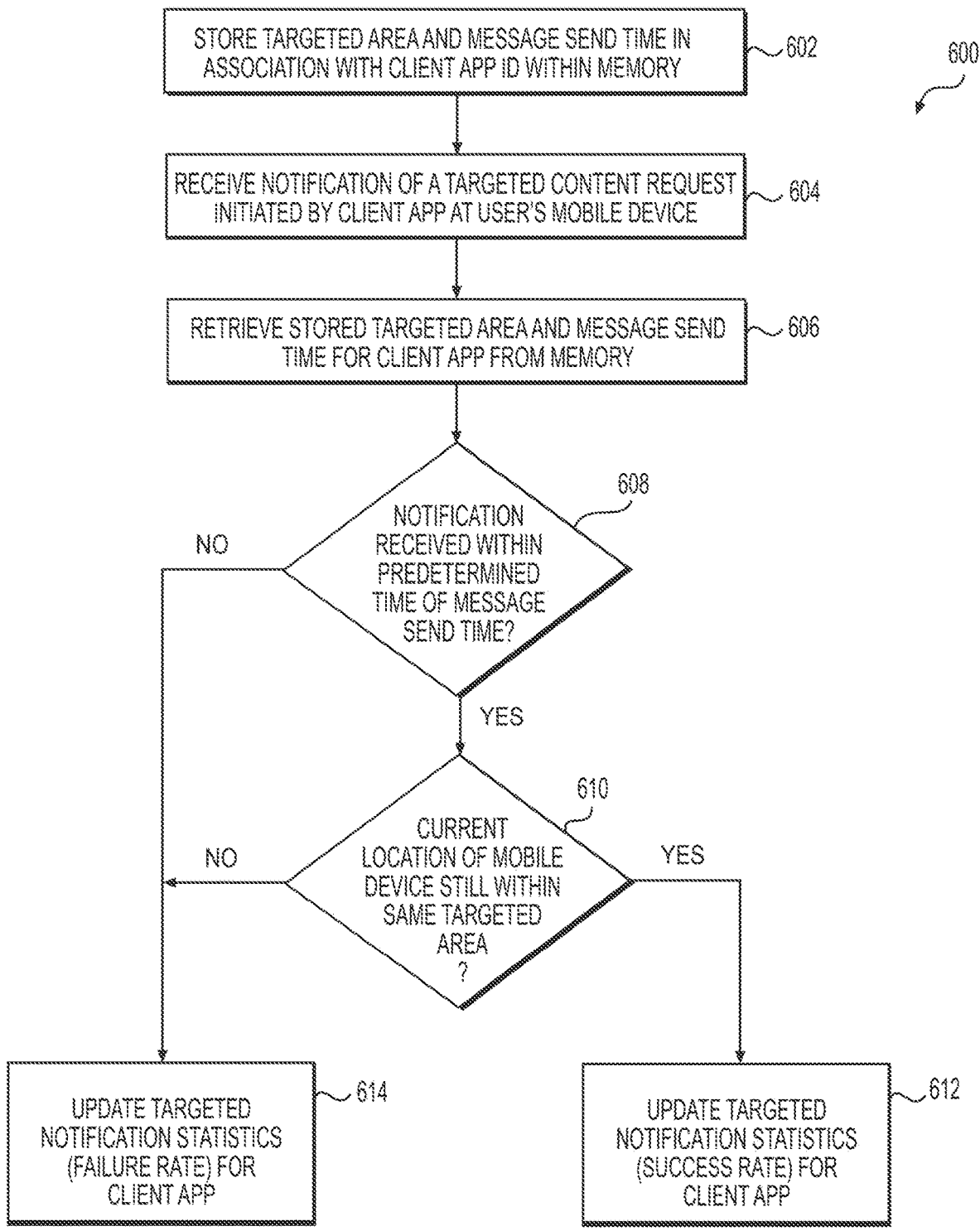
FIG. 6 is a process flow diagram of an exemplary method for updating targeted content delivery statistics based on a recent message notification sent to the mobile device user of FIG. 5 within a predetermined period of time.

As described above, method 500 may proceed to step 602 of method 600 after a queued message is sent to the user's mobile device in step 510. As shown by the example of FIG. 6, the steps of method 600 may be used for updating targeted content delivery statistics based on the message notification sent previously to the user's mobile device, as described above. In an example, the statistics may be updated for a particular message only within a predetermined period of time after the message was sent. Such a predetermined time period may be based on, for example, the expiration time associated with the message, as described above.

Like method 500, method 600 will be described using system 200 of FIG. 2 and the components of processes 300 and 400 of FIGS. 3 and 4, as described above, for discussion purposes only, but method 600 is not intended to be limited thereto. As shown in FIG. 6, method 600 includes steps 602, 604, 606, 608, 610, and 612. However, it should be noted that method 500 may include more or fewer steps as desired for a particular implementation. In an example, one or more of the above-listed steps of method 600 may be executed by message server 240 of FIG. 2 or message server 340 of FIGS. 3 and 4, as described above. However, method 600 is not intended to be limited thereto, and the steps of method 500 may be performed by any server (e.g., application server 230 of FIG. 2 or application server 330 of FIGS. 3 and 4) or other type of computing device having at least one processor, a memory, and a network communication interface for sending and receiving information from one or more user devices.

Method 600 begins in step 602, which includes storing information related to the targeted content area, which may have been previously identified based on the current geographic location of the mobile device, e.g., as determined by the message and/or content servers pursuant to steps 506 and 508 of method 500 of FIG. 5, a described above. Step 602 may also include storing a record of the time that the message was sent from the message queue (e.g., in step 510 of method 500), also referred to herein as the "message send time."

Method 600 then proceeds to step 604, which includes receiving a notification of a targeted content request initiated by the client application at the user's mobile device. In step 606, the stored information relating to the targeted content area and message send time for the previously sent message is retrieved for the client application from a memory device or data store (e.g., database 245 of FIG. 2). The retrieved information may then be used to determine whether or not the content request initiated by the client application corresponds to the same client application (e.g., based on a unique application identifier stored for the client application) executable at the same user device (e.g., based on a separate device identifier stored for the particular user device), which is located within the same targeted content area identified previously. However, it is first determined in step 608 whether or not the notification of the initiated targeted content request is received within the predetermined time period of the message send time, as described above. If the notification is determined to be received within the predetermined time period, method 600 proceeds to step 610, in which it is further determined whether or not the current location of the mobile device is within the same targeted area.

If the mobile device is determined to be within the same targeted content area, method 600 proceeds to step 612, in which a set of targeted notification statistics (e.g., a success rate) for the client application may be updated (e.g., increased or incremented by some predetermined value). In an example, the success rate may indicate a likelihood that targeted content would be delivered for the client application at the user's device, as a result of the message notification timing functionality described herein, e.g., which may have enticed the user at the mobile device to launch and therefore actively execute at the user's device, as previously described.

However, if either the request is determined not to have been initiated by the client application within the predetermined time period (in step 608) or the current location of the mobile device is determined not to be within the same targeted content area (in step 610), method 600 proceeds to step 614, which also includes updating the targeted notifications statistics for the client application, except that a failure rate is updated (e.g., increased or incremented by some predetermined value). The failure rate may therefore indicate the likelihood that targeted content would not be delivered to the client application at the user's device, or that the user would not launch the client application upon seeing the message notification sent to the user's device (e.g., in step 510 of method 500 of FIG. 5).

Figure 8:
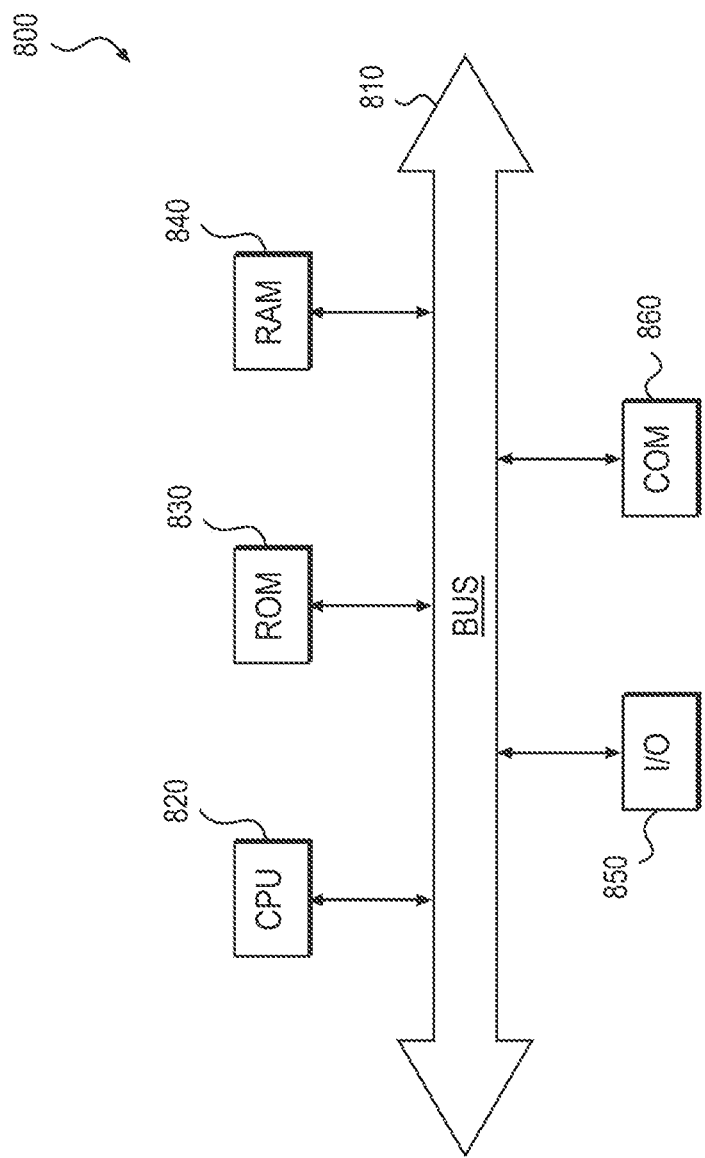
FIG. 8 is a block diagram of an exemplary computer system in which embodiments of the present disclosure may be implemented.

FIG. 8 provides a high-level functional block diagram illustrating an exemplary general purpose computer 800. Computer 800 may be used to implement, for example, any of application server 230, message server 240, or content server 250 of FIG. 2 in addition to application server 330, message server 340, or content server 350 of FIGS. 3 and 4, as described above. It is believed that those skilled in the art are familiar with the structure, programming and general operation of such computer equipment and as a result the drawings should be self-explanatory.

In an example, computer 800 may represent a computer hardware platform for a server or the like. Accordingly, computer 800 may include, for example, a data communication interface for packet data communication 860. The platform may also include a central processing unit (CPU) 820, in the form of one or more processors, for executing program instructions. The platform typically includes an internal communication bus 810, program storage and data storage for various data files to be processed and/or communicated by the platform such as ROM 830 and RAM 840, although the computer 800 often receives programming and data via network communications 870. The hardware elements, operating systems and programming languages of such equipment are conventional in nature, and it is presumed that those skilled in the art are adequately familiar therewith. Computer 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for timing location determinations to optimize delivery of targeted content to mobile device users, the method comprising:
    determining whether a current geographic location of a mobile device is within a predetermined geographic area;
    storing a location time identifying when the mobile device was determined to be within the predetermined geographic area; and
    determining whether a request for targeted content was initiated by a client application of the mobile device within a predetermined time period of the stored location time,
    wherein the expiration time associated with the message is based on a priority level assigned to the message by an application service provider associated with a client application.

2. The method of claim 1, further comprising:
    determining, upon receiving an updated current geographic location of the mobile device, whether the updated current geographic location of the mobile device is within the predetermined geographic area; and
    transmitting, the targeted content when the updated geographic location of the mobile device is determined to be within the predetermined geographic area.

3. The method of claim 1, wherein determining whether the current geographic location of the mobile device is within the predetermined geographic area comprises:
    transmitting a request including a current geographic location of the mobile device to a content server that is configured to determine whether the current geographic location of the mobile device corresponds to the predetermined geographic area; and
    receiving a response from the content server indicating whether the current geographic location of the mobile device is within the predetermined geographic area based on the determination by the content server.

4. The method of claim 1, wherein the targeted content is an electronic advertisement provided by a third-party content provider that is not directly associated with a client application executable at a mobile device of a user.

5. The method of claim 1, wherein the predetermined period of time is based on an expiration time associated with a message that is added to a message queue, and the message is sent from the message queue for display on a mobile device of a user when at least one of (i) the current geographic location of the mobile device is later determined to be within the predetermined geographic area before the expiration time has elapsed, and (ii) once the expiration time for the message is determined to have elapsed.

6. A system for timing location determinations to optimize delivery of targeted content to mobile device users, the system comprising:
a memory having processor-readable instructions stored therein; and
a processor that accesses the memory and executes the processor-readable instructions, which when executed by the processor configures the processor to perform a plurality of functions, including functions to:
determine whether a current geographic location of a mobile device is within a predetermined geographic area;
store a location time indicating when the mobile device was determined to be within the predetermined geographic area; and
determine whether a request for targeted content was initiated by a client application of the mobile device within a predetermined time period of the stored location time,
wherein the expiration time associated with the message is based on a priority level assigned to the message by an application service provider.

7. The system of claim 6, wherein the processor is further configured to perform functions to:
determine, upon an updated current geographic location of the mobile device, whether the updated current geographic location of the mobile device is within the predetermined geographic area; and
transmit the targeted content when the updated geographic location of the mobile device is determined to be within the predetermined geographic area.

8. The system of claim 6, wherein determining whether the current geographic location of the mobile device is within the predetermined geographic area comprises:
transmit a request including a current geographic location of the mobile device to a content server that is configured to determine whether the current geographic location of the mobile device corresponds to the predetermined geographic area; and
receive a response from the content server indicating whether the current geographic location of the mobile device is within the predetermined geographic area based on the determination by the content server.

9. The system of claim 6, wherein the targeted content is an electronic advertisement provided by a third-party content provider that is not directly associated with a client application executable at a mobile device of a user.

10. The system of claim 6, wherein the predetermined period of time is based on an expiration time associated with a message that is added to a message queue, and the message is sent from the message queue for display on a the mobile device when at least one of (i) the current geographic location of the mobile device is later determined to be within the predetermined geographic area before the expiration time has elapsed, and (ii) once the expiration time for the message is determined to have elapsed.

11. A non-transitory computer readable medium storing instructions that, when executed by a computer, cause the computer to perform functions to:
determine whether a current geographic location of a mobile device is within a predetermined geographic area;
store a location time indicating when the mobile device was determined to be within the predetermined geographic area; and
determine whether a request for targeted content was initiated by a client application of the mobile device within a predetermined time period of the stored location time,
wherein the expiration time associated with the message is based on a priority level assigned to the message by an application service provider associated with a client application.

12. The computer-readable medium of claim 11, wherein the computer is further caused to perform functions to:
determine, upon receiving an updated current geographic location of the mobile device, whether the updated current geographic location of the mobile device is within the predetermined geographic area; and
transmit the targeted content when the updated geographic location of the mobile device is determined to be within the predetermined geographic area.

13. The computer-readable medium of claim 11, wherein determining whether the current geographic location of the mobile device is within the predetermined geographic area comprises:
transmitting a request including a current geographic location of the mobile device to a content server that is configured to determine whether the current geographic location of the mobile device corresponds to the predetermined geographic area; and
receiving a response from the content server indicating whether the current geographic location of the mobile device is within the predetermined geographic area based on the determination by the content server.

14. The computer-readable medium of claim 11, wherein the targeted content is an electronic advertisement provided by a third-party content provider that is not directly associated with a client application executable at a mobile device of a user.

15. The computer-readable medium of claim 11, wherein the predetermined period of time is based on an expiration time associated with a message that is added to a message queue, and the message is sent from the message queue for display on a mobile device of a user when at least one of (i) the current geographic location of the mobile device is later determined to be within the predetermined geographic area before the expiration time has elapsed, and (ii) once the expiration time for the message is determined to have elapsed.

* * * * *